US012505376B2

(12) United States Patent
Rawat et al.

(10) Patent No.: US 12,505,376 B2
(45) Date of Patent: Dec. 23, 2025

(54) FEDERATED LEARNING WITH ONLY POSITIVE LABELS

(71) Applicant: Google LLC, Mountain View, CA (US)

(72) Inventors: Ankit Singh Rawat, New York, NY (US); Xinnan Yu, Forest Hill, NY (US); Aditya Krishna Menon, New York, NY (US); Sanjiv Kumar, Jericho, NY (US)

(73) Assignee: GOOGLE LLC, Mountain View, CA (US)

( * ) Notice: Subject to any disclaimer, the term of this patent is extended or adjusted under 35 U.S.C. 154(b) by 1291 days.

(21) Appl. No.: 17/227,851

(22) Filed: Apr. 12, 2021

(65) Prior Publication Data

US 2021/0326757 A1 Oct. 21, 2021

Related U.S. Application Data

(60) Provisional application No. 63/008,254, filed on Apr. 10, 2020.

(51) Int. Cl.
*G06N 20/00* (2019.01)
*G06F 17/16* (2006.01)
*G06N 5/02* (2023.01)

(52) U.S. Cl.
CPC ............ *G06N 20/00* (2019.01); *G06F 17/16* (2013.01); *G06N 5/027* (2013.01)

(58) Field of Classification Search
CPC ......... G06N 20/00; G06N 5/027; G06F 17/16
See application file for complete search history.

(56) References Cited

U.S. PATENT DOCUMENTS

| | | | |
|---|---|---|---|
| 2015/0206064 A1* | 7/2015 | Levman | G06N 20/00 706/12 |
| 2021/0117780 A1* | 4/2021 | Malik | G06F 9/547 |

OTHER PUBLICATIONS

Zhang, Xu, Felix X. Yu, Sanjiv Kumar, and Shih-Fu Chang. "Learning spread-out local feature descriptors." In Proceedings of the IEEE international conference on computer vision, pp. 4595-4603. 2017. (Year: 2017).*
Abadi et al, "Deep Learning with Differential Privacy", arXiv:1607v2, Oct. 24, 2016, 14 pages.
Agarwal et al, "cpSGD: Communication-Efficient and Differentially-Private Distributed SGD", arXiv:1805v1, May 27, 2018, 28 pages.
Augenstein et al, "Generative Models for Effective ML on Private, Decentralized Dataset", arXiv:1911v2, Feb. 4, 2020, 26 pages.

(Continued)

*Primary Examiner* — Casey R. Garner
(74) *Attorney, Agent, or Firm* — DORITY & MANNING P.A.

(57) ABSTRACT

Generally, the present disclosure is directed to systems and methods that perform spreadout regularization to enable learning of a multi-class classification model in the federated setting, where each user has access to the positive data associated with only a limited number of classes (e.g., a single class). Examples of such settings include decentralized training of face recognition models or speaker identification models, where in addition to the user specific facial images and voice samples, the class embeddings for the users also constitute sensitive information that cannot be shared with other users.

20 Claims, 5 Drawing Sheets

(56) References Cited

OTHER PUBLICATIONS

Barlett et al, "Convexity, Classification, and Risk Bounds", Journal of American Statistical Association, 36 pages.
Bonawitz et al, "Practical Secure Aggregation for Federated Learning on User-Held Data", arXiv:1611v1. Nov. 14, 2016, 5 pages.
Chechik et al., "Large Scale Online Learning of Image Similarity Through Ranking", Journal of Machine Research, vol. 11, 2010, 27 pages.
Chopra et al, "Learning a Similarity Metric Discriminatively, with Application to Face Verification", Computer Vision and Pattern Recognition, 8 pages.
Dietterich et al, "Error-Correcting Output Codes: A General Method for Improving Multiclass Inductive Learning Programs", Connectionist Representations, pp. 572-577.
Elkan et al, "Learning Classifiers from Only Positive and Unlabeled Data", International Conference on Knowledge Discovery and Data Mining, 2008, pp. 213-220.
Guo et al, "Breaking the Glass Ceiling for Embedding-Based Classifiers for Large Output Spaces", Conference on Neural Information Processing Systems, Vancouver, Canada, 11 pages.
Hadsell et al, "Dimensionality Reduction by Learning an Invariant Mapping", Computer Vision and Pattern Recognition, 8 pages.
He et al, "Deep Residual Learning for Image Recognition", arXiv:1512v1, Dec. 10, 2015, 12 pages.
He et al, "Identity Mappings in Deep Residual Networks", arXiv:1603v3, Jul. 25, 2016, 15 pages.
Hsieh et al, "PU Learning for Matrix Completion", International Conference on Machine Learning, 2015, 9 pages.
Li et al, "Federated Learning; Challenges, Methods, and Future Directions", arXiv:1908v1, Aug. 21, 2019, 21 pages.
Liu et al, "Partially Supervised Classification of Text Documents", International Conference on Machine Learning, 2002, 8 pages.
Manevitz et al, "One-Class SVMS for Document Classification", Journal of Machine Learning Research, 2001, pp. 139-154.
McMahan et al, "Communication-Efficient Learning of Deep Networks from Decentralized Data", arXiv:1602v3, Feb. 28, 2017, 11 pages.
Mohri et al, "Agnostic Federated Learning", arXiv:1902v1, Feb. 1, 2019, 30 pages.
Moya et al, "Network Constraints and Multi-Objective Optimization for One-Class Classification", Neural Networks, vol. 9, No. 3, pp. 463-474.
Plessis et al, "Convex Formulation for Learning from Positive and Unlabeled Data", International Conference on Machine Learning, 2015, 9 pages.
Pujol et al, "Discriminant ECOC: A Heuristic Method for Application Dependent Design of Error Correcting Output Codes", Pattern Analysis and Machine Intelligence, vol. 28, No. 6, Jun. 2006, pp. 1007-1012.
Reddi et al, "Stochastic Negative Mining for Learning with Large Output Spaces", arXiv:1801v1, Oct. 16, 2018, 18 pages.
Varma et al, "Extreme Classification Repository", http://manikvarma.org/downloads/XC/XMLRepository.html, retrieved on Apr. 12, 2021.
Yu et al, "Designing Category-Level Attributes for Discriminative Visual Recognition", Computer Vision and Pattern Recognition, 8 pages.
Zhang et al, "Statistical Behavior and Consistency of Classification Methods Based on Convex Risk Minimization", the Annals of Statistics, vol. 32, No. 1, 2004, pp. 56-85.
Zhang et al, "Learning Spread-Out Local Feature Descriptors", International Conference on Computer Vision, 9 pages.

\* cited by examiner

FEDERATED LEARNING WITH ONLY POSITIVE LABELS

RELATED APPLICATIONS

This application claims priority to and the benefit of U.S. Provisional Patent Application No. 63/008,254, filed Apr. 10, 2020. U.S. Provisional Patent Application No. 63/008, 254 is hereby incorporated by reference in its entirety.

FIELD

The present disclosure relates generally to learning a multi-class classification model in a federated learning setting. More particularly, the present disclosure relates to systems and methods which perform spreadout regularization to enable federated learning in scenarios in which each user has access to primarily or solely positive training examples associated with a limited number of classes (e.g., a single class associated with the user).

BACKGROUND

The federated learning framework enables learning of a machine-learned model or across multiple decentralized devices (e.g., user devices such as smartphones) which each hold respective local data samples, typically without requiring exchange of the data samples between devices or to a central authority. This approach stands in contrast to traditional centralized machine learning techniques where all data samples are uploaded to a centralized authority, as well as to more classical decentralized approaches which assume that local data samples are identically distributed.

In some example scenarios in which the federated learning framework may be applied, each user has only access to positive examples for a limited number of classes (e.g., a single class associated with a particular user). Positive examples for a particular class can refer to training examples that are known or believed to belong to such class, while negative examples for a particular class can refer to training examples that are known or believed to not belong to such class (e.g., the negative example may belong to another, different class and therefore be a positive example such other, different class).

Further, the users are not allowed to communicate with each other, nor do they have access to the classification model parameters associated with other users' classes. One type of classification model is "embedding-based" discriminative models. For embedding-based models, both the classes and the input instance are embedded into the same space, and the similarity between the class embedding and the input embedding (a.k.a. logit or score) captures the likelihood of the input belonging to the class. A popular example of this framework are neural network based classifiers. Here, given an input instance $x \in \chi$, a neural network $g_\theta: \chi \rightarrow \mathbb{R}^d$ (parameterized by $\theta$) embeds the instance into a d dimensional vector $g_\theta(x)$. The class embeddings are learned as a matrix $W \in \mathbb{R}^{C \times d}$, commonly referred to as the classification matrix, where C denotes the number of classes. Finally, the logits for the instance x are computed as $W \cdot g_\theta(x)$. In the federated learning setup, one collaboratively learns the classification model with the help of a server which facilitates the iterative training process by keeping track of a global model. During each round of the training process, the server sends the current global model to a set of participating users; each user updates the model with its local data, and sends the model delta to the server; and the server averages (e.g., via "Federated Averaging") the deltas collected from the participating users and updates the global model. Notice that the conventional synchronized distributed SGD falls into the federated learning framework if each user runs a single step of SGD, and the data at different users is i.i.d. Federated learning has been widely studied in distributed training of neural networks due to its appealing characteristics such as leveraging the computational power of edge devices, removing the necessity of sending user data to server, and various improvements on trust/security, privacy, and fairness. However, conventional federated learning algorithms are not directly applicable to the problem of learning with only positive labels due to two key reasons: First, the server cannot communicate the full model to each user. Besides sending the instance embedding model $g_\theta(\cdot)$, for the i-th user, the server can communicate only the class embedding vector $w_i$ associated with the positive class of the user. Note that, in various applications, the class embeddings constitute highly sensitive information as they can be potentially utilized to identify the users. Although the notation used for the remainder of the present disclosure assumes only a single positive class for each user, there may be cases where a limited number of classes greater than one may be associated with one or more of the users (e.g., a single computing device or system may be consensually shared by two or more users). Second, when the i-th user updates the model using its local data, it only has access to a set of instances $x \in \chi_i$ from the i-th class along with the class embedding vector $w_i$. While training a standard embedding-based multi-class classification models, the underlying loss function encourages two properties: i) similarity between an instance embedding and the positive class embedding should be as large as possible; and ii) similarity between the instance embedding and the negative class embeddings should be as small as possible. In the positive-examples-only problem setting, the latter is not possible because the user does not have access to the negative class embeddings. In other words, if the vanilla federated learning approach is used in such setting, the result would essentially be minimizing a loss function that only encourages small distances between the instances and their positive classes in the embedding space. As a result, this approach would lead to a trivial optimal solution where all instances and classes collapse to a single point in the embedding space.

SUMMARY

Aspects and advantages of embodiments of the present disclosure will be set forth in part in the following description, or can be learned from the description, or can be learned through practice of the embodiments.

One example aspect of the present disclosure is directed to a computing system that performs spreadout regularization to enable federated learning with only positive labels. The computing system includes a coordinating computing system configured to perform coordinating operations. The coordinating operations are performed for at least one of one or more update iterations. The coordinating operations include accessing a current classification matrix that comprises a plurality of class embeddings respectively associated with a plurality of classes. The coordinating operations include receiving, respectively from one or more client computing devices, one or more updates respectively to one or more class embeddings of the plurality of class embeddings, wherein each update to one of the class embeddings was generated by a corresponding client computing device based on only positive training examples that have positive labels for a corresponding class. The coordinating operations include generating an intermediate classification matrix that comprises a plurality of intermediate class embeddings, wherein generating the intermediate classification matrix comprises applying the one or more updates respectively to the one or more class embeddings of the plurality of class embeddings. The coordinating operations include performing a spreadout regularization on at least a subset of the intermediate class embeddings contained in the intermediate classification matrix to obtain an updated classification matrix, wherein performing the spreadout regularization comprises modifying at least one of the class embeddings included in at least the subset of the intermediate class embeddings to increase a cumulative spacing among at least the subset of the intermediate class embeddings. The coordinating operations include outputting the updated classification matrix for use in performing classification.

Another example aspect of the present disclosure is directed to a client computing device that includes one or more processors and one or more non-transitory computer-readable media that collectively store: one or more positive training examples that have a positive label for a first class of a plurality of different classes; and instructions that, when executed by the one or more processors, cause the client computing device to perform client operations. The client operations are performed for at least one of one or more update iterations. The client operations include receiving, from a coordinating computing system, a current version of a first class embedding associated with the first class. The client operations include determining an update to the first class embedding for the first class based only on the one or more positive training examples. The client operations include communicating the update to the first class embedding to the coordinating computing system for spreadout regularization by the coordinating computing system, wherein the spreadout regularization increases a cumulative spacing among at least a subset of a plurality of class embeddings associated with the plurality of different classes, and wherein the first class embedding is included in at least the subset of the plurality of class embeddings.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to systems and methods that perform spreadout regularization to enable learning of a multi-class classification model in the federated setting, where each user has access to the positive data associated with only a limited number of classes (e.g., a single class). Examples of such settings include decentralized training of face recognition models or speaker identification models, where in addition to the user specific facial images and voice samples, the class embeddings for the users also constitute sensitive information that cannot be shared with other users.

As a result of the positive-examples-only setting, during each federated learning round, the users need to locally update the classifier without having access to the features and the model parameters for the negative classes. Thus, naively employing conventional decentralized learning such as the distributed SGD or Federated Averaging may lead to trivial or extremely poor classifiers. In particular, for the embedding based classifiers, all the class embeddings might collapse to a single point.

To address this problem, the present disclosure proposes a generic framework for training with only positive labels, some example implementation of which may be referred to as Federated Averaging with Spreadout (FedAwS). In the proposed framework, the server or other central coordinating authority imposes a geometric regularizer after each round to encourage classes to be spreadout in the embedding space. Aspects of the present disclosure show, both theoretically and empirically, that implementations of the proposed framework can almost match the performance of conventional learning where users have access to negative labels.

The proposed methods are also applicable to the settings with large output spaces such as settings with a large number of classes. This is important for the real-world applications such as user identification models with a large number of users.

In addition, portions of U.S. Provisional Patent Application No. 63/008,254, which is fully incorporated into and forms a portion of this disclosure, theoretically justify the FedAwS framework by showing that it approximates the conventional training settings with a loss function that has access to both positive and negative labels and confirm the effectiveness of the proposed framework on various standard datasets.

The systems and methods of the present disclosure provide a number of technical effects and benefits. For instance, federated learning offers several advantages compared to performing learning at a centralized server. In one aspect, federated learning leverages the computational power of a large number of computing devices (e.g., user mobile devices) to improve the overall abilities of the interconnected computing system formed thereby. As one example, the techniques described herein enable the effective training of a machine-learned embeddings used to perform a computational task (e.g., an image processing, computer vision task, sensor data processing task, audio processing task, text processing task, classification task, detection task, recognition task, data search task, etc.). Thus, the systems and methods of the present disclosure can improve the ability of a computing system that includes the machine-learned model to perform various practical applications, thereby improving the functioning of such a computing system.

Another benefit of federated learning is the ability to train models and generate embeddings with reduced communication of private information. Generally, information of the model update is less sensitive than the data itself. Thus, user data that is privacy sensitive remains at the user's computing device and is not uploaded to the server. Instead, only the less sensitive model update is transmitted. In some implementations, the server communications may further be secured by cryptographic protocols or other differential privacy techniques. In further implementations, the individual updates submitted by a client may not be retained individually after aggregation of a set or batch of client updates. The privacy of federated learning may be further increased according to the present disclosure by optionally obfuscating the model parameters and/or embeddings being updated by a particular client by selectively distributing model parameters to be updated by the client among a larger subset of model parameters. In this manner, the particular embeddings associated with the activity of the client device (e.g., in providing the training data used to update the embedding) are not directly traceable from the server's distribution of embeddings. By reducing the sensitivity of the communicated information, the computational demand for encrypted communication is lowered, thereby increasing the efficiency of resource usage for other tasks of the computing device(s).

Of additional benefit, the retention of the training data on the local device may permit more detailed and more heterogeneous training data. Training data may be drawn from a variety of sources, including text entry to various applications, voice commands and other audio inputs, user gestures, webpage and/or application navigation and retrieval, and the like to form a heterogeneous set. While such a diverse set of training data may improve the training of a model, the set may form a holistic snapshot of user activity and highly sensitive information. Advantageously, retaining the training data locally permits the use of more heterogenous training data while also limiting the communication of sensitive information. In the same manner, local training may have access to a more comprehensive and representative stream of user data (e.g., complete location history rather than infrequent samples) than would otherwise be available due to the sensitivity of the information. The depth and heterogeneity of the training data may also permit, in some implementations, embeddings generated therewith to be more fully featured and represent more diverse information about the embedded entity and/or interactions with entities across varied domains.

Generally, the above-noted improvement in the detail and diversity of training data may enable more effective and/or accurate embeddings to be generated in fewer training iterations. Accuracy improvements can provide for improvements in the ability of computing devices and systems to perform a desired task with greater speed and efficiency. For instance, a computing device which performs prediction, recognition, and/or categorization tasks involving embeddings generated as disclosed herein may perform the tasks satisfactorily after fewer training iterations at a lower expense of computing resources. Additionally, the accuracy of the embeddings may also enable, in some embodiments, a user of a computing device or system as disclosed herein to accomplish a particular task with fewer repetitions, lower wait times, and/or an improved user experience.

Of additional benefit, methods and systems of the present disclosure, in one aspect, are directed to the joint learning/training of global embeddings (e.g., embeddings of entities available to/accessed by a number of clients) and local user embeddings (e.g., embeddings of the characteristics of a particular client). The joint training of global embeddings with user embeddings may advantageously permit the user embeddings to be discovered and/or generated without feature engineering beforehand, thus reducing the manual and/or computational cost of generating user embeddings and improving the functionality of machine-learned systems dependent thereon.

As another example technical effect and benefit, the systems and methods of the present disclosure provide an embedding serving scheme that enables the federated learning of embeddings without requiring transmission of the entire vocabulary of embeddings at each learning iteration but without unduly comprising user privacy.

Examples of embodiments and implementations of the systems and methods of the present disclosure are discussed in the following sections.

Example Problem Setting

Example Federated Learning of a Classification Model

This section will first describe the conventional federated learning of a classification model, when each client has access to data from multiple classes. Let the instance space be $\chi$, and suppose there are C classes indexed by the set [C]. Let $\mathcal{F} \subseteq \{f: \chi \to \mathbb{R}^C\}$, be a set of scorer functions, where each scorer, given an instance x, assigns a score to each of the C classes. In particular, for $c \in [C]$, $f(x)_c$ represents the relevance of the c-th class for the instance x, as measured by the scorer $f \in \mathcal{F}$. Consider scorers of the form $f(x)=Wg_\theta(x)$, (1) where $g_\theta: \chi \to \mathbb{R}^d$ maps the instance x to a d-dimensional embedding, and $W \in \mathbb{R}^{C \times d}$ uses this embedding to produce the scores (a.k.a logits) for C classes as $Wg_\theta(x)$. The c-th row of W, $w_c$, is referred to as the embedding vector of the c-th class. The score of the c-th class is thus $w_c^T g_\theta(x)$. Assume a distributed setup with m clients. In the traditional federated learning setup, for $i \in [m]$, the i-th client has access to $n_i$ instance and label pairs $S^i = \{(x_1^i, y_1^i), \ldots, (x_{n_i}^i, y_{n_i}^i)\} \subset \chi \times [C]$ distributed according to an unknown distribution $P_{XY}^i$, i.e., $(x_j^i, y_j^i) \sim P_{XY}^i$. Let $S = \cup_{i \in [m]} S^i$ denote the set of $n = \Sigma_{i \in [m]} n_i$ instance and label pairs collectively available at all the clients. One objective is to find a scorer in $\mathcal{F}$ that captures the true relevance of a class for a given instance. Formally, let $\ell: \mathbb{R}^C \times [C] \to \mathbb{R}$ be a loss function such that $\ell(f(x), y)$ measures the quality of the scorer $f$ on $(x, y)$ pair. The client minimizes an empirical estimate of the risk based on its local observations $S^i$ as follows:

$$\hat{f} = \mathrm{argmin}_{f \in \mathcal{F}} \hat{R}(f; S^i) := \frac{1}{n_i} \sum_{j \in [n_i]} \ell(f(x_j^i), y_j^i). \quad (2)$$

In the federated learning setting, the m clients are interested in collaboratively training a single classification model on their joint data. A coordinator server facilitates the joint iterative distributed training as follows: • At the t-th round of training, the coordinator sends the current model parameters $\theta_t$ and $W_t$ to all clients. • For $i \in [m]$, the i-th client updates the current model based on its local empirical estimate of the risk:

$$\theta_t^i = \theta_t - \eta \cdot \nabla_{\theta_t} \hat{R}(f_t; S^i). \quad (3)$$

$$W_t^i = W_t - \eta \cdot \nabla_{W_t} \hat{R}(f_t; S^i). \quad (4)$$

In the federated learning setup, the client may also update the model with a few steps, not just a single step.

The coordinator receives the updated model parameters from all clients $\{\theta_t^i, W_t^i\}_{i \in [m]}$, and updates its estimate of the model parameters using Federated Averaging:

$$\theta_{t+1} = \sum_{i \in [m]} \omega_i \cdot \theta_t^i; \; W_{t+1} = \sum_{i \in [m]} \omega_i \cdot W_t^i, \quad (5)$$

where $\omega = (\omega_1, \ldots, \omega_m)$ denotes the weights that the coordinator assigns to the training samples of different clients. For example, $$\omega_i = \frac{n_i}{n}$$

assigns uniform importance to all the training samples across different clients. An agnostic federated learning framework can be used to account for the heterogeneous data distribution across the clients, which crucially rely on the selecting the non-uniform weights. In this disclosure, for the ease of exposition, the discussion is in the context of uniform weights to the uniform weights, i.e., $$\omega_i = \frac{n_i}{n}.$$

In the above, assuming that each client has data of multiple classes, the loss function in (2) can take various forms such as the contrastive loss, triplet loss, and softmax cross-entropy. All such losses encourage two properties:

First, the embedding vector $g(x_j^i)$ and its positive class embedding $w_{y_j^i}$ are close. In other words, one wants large logits or scores for positive instance and label pairs.

Second, the embedding vector $g(x_j^i)$ and its negative class embeddings $w_c$, $c \neq y_j^i$ are far away. In other words, one wants small logits or scores for negative instance and label pairs.

For example, given a distance measure $d(\cdot, \cdot)$, the contrastive loss is expressible as $$\ell_{cl}(f(x), y) = \underbrace{\alpha \cdot (d(g_\theta(x), w_y))^2}_{\ell_{cl}^{pos}(f(x), y)} + \underbrace{\beta \cdot \sum_{c \neq y} (\max\{0, \nu - d(g_\theta(x), w_c)\})^2}_{\ell_{cl}^{neg}(f(x), y)}, \quad (6)$$

where $\alpha, \beta \in \mathbb{R}$ are some predefined constants. In (6), $\ell_{cl}^{pos}(\cdot)$ encourages high logit for the positive instance and label pairs. Similarly, $\ell_{cl}^{neg}(\cdot)$ aims to decrease the logit for the negative instance and label pairs.

Example Federated Learning with Only Positive Labels

Example aspects of the present disclosure resolve problems associated with the case where each client has access to only the data belonging to a limited number of classes (e.g., a single class). To simplify the notation, assume that there are $m = C$ clients and the i-th client has access of the data of the i-th class. The algorithm and analysis also applies to the setting where multiple clients have the same class.

The clients are not allowed to share their data with other clients, nor can they access the label embeddings associated with other clients. Formally, in each communication round, the i-th client has access to:

(1) $n_i$ instance and label pairs with the same label i: $S^i = \{(x_1^i, i), \ldots, (x_{n_i}^i, i)\} \subset \chi \times [C]$ (2) Its own class embedding $w_i$.

(3) The current instance embedding model parameter $\theta$.

Without access to the negative instance and label pairs, the loss function can only encourage the instances embedding and the positive class embedding to be close to each other. For example, with the contrastive loss in (6), in the absence of negative labels, one can only employ $\ell_{cl}^{pos}(\cdot)$ part of the loss function. Since $\ell_{cl}^{pos}(\cdot)$ is a monotonically decreasing function of the distance between the instance and the positive label, this approach would quickly lead to a trivial solution with small risk where all the users and the classes have an identical embedding. Regardless of the underlying loss function, training with only positive instance and label pairs will result in this degenerate solution. The next section proposes example algorithms to address this problem.

EXAMPLE ALGORITHMS

To prevent all the class embeddings $\{w_i\}_{i=1}^C$ from collapsing into a single point in the optimization process, the present disclosure proposes Federated Averaging with Spreadout (FedAwS).

Example Federated Averaging with Spreadout (FedAwS)

In addition to Federated Averaging, the server performs an additional optimization step on the class embedding matrix $W \in \mathbb{R}^{C \times d}$ to ensure that different class embeddings are separated from each other by at least a margin of $\nu$. In particular, in each round of training, the server employs a geometric regularization, namely spreadout regularizer, which takes the following form.

$$reg_{sp}(W) = \sum_{c \in [C]} \sum_{c' \neq c} (\max\{0, \nu - d(w_c, w_{c'})\})^2. \quad (7)$$

According to an aspect of the present disclosure, the spreadout regularizer along with the positive part of the underlying loss function (e.g., $\ell_{cl}^{pos}(\cdot)$ in (6)) constitutes a valid loss function that takes the similarity of the instance from both positive and negative labels into account (cf. Section 5). This proves critical in realizing the meaningful training in the federated setting with only positive labels.

Example Algorithm 1: Federated Averaging with Spreadout (FedAwS)

---

1) Input. For C clients and C classes indexed by [C], $n_i$ examples $S_i$ at the i-th client.
2) Server initializes model parameters $\theta^0$, $W^0$.
3) for t = 0, 1, ..., T − 1 do -continued 4) The server communicates $\theta^t$, $w_i^t$ to the i-th client.
5) for i = 1, 2, ..., C do
6)    The i-th client updates the model based on $S_i$:
7)    $(\theta^{t,i}, w_i^{t,i}) \leftarrow (\theta^t, w_i^t) - \eta \nabla_{(\theta^t, w_i^t)} \hat{R}_{pos}(S^i)$, 8)    where $\hat{R}_{pos}(S^i) = \frac{1}{n_i} \Sigma_{j \in [n_i]} \ell_{cl}^{pos}(f(x), y)$.

9)    The i-th client sends $(\theta^{t,i}, w_i^{t,i})$ to the server.
10) end for
11) Server updates the model parameters:

12)    $\theta^{t+1} = \frac{1}{C} \Sigma_{i \in [C]} \theta^{t,i}$.

13)    $\tilde{W}^{t+1} = [w_1^{t,1}, \ldots, w_C^{t,C}]^T$.
14)    $W^{t+1} \leftarrow \tilde{W}^{t+1} - \lambda \eta \nabla_{\tilde{W}^{t+1}} reg_{sp}(\tilde{W}^{t+1})$.
15) end for
16) Output: $\theta^T$ and $W^T$.

An example FedAwS algorithm which modifies the Federated Averaging using the spreadout regularizer is summarized in Example Algorithm 1, provided above. Note that in Step 7, the local objective at each client is define by the positive part $\ell^{pos}(\bullet)$ of the underlying loss (cf. (6)). As examples, the algorithm differs from the conventional Federated Averaging in the two following ways: First, averaging of W is replaced by updating the class embeddings received from each client (Step 13). Second, an additional optimization step is performed on the server to encourage the separation of the class embeddings (Step 14). Here, a learning rate multiplier $\lambda$ can be used to control the effect of the spreadout regularization term on the trained model.

Remark 1 In Algorithm 1, it is assumed that all clients participate in each communication round for the ease of exposition. However, the algorithm easily extends to the practical setting, where only a subset of clients are involved in each round: Let $C^t$ denote the set of clients participating the t-th round. Then, the server performs the updates in Step 12 and Step 13 with the help of the information received from the clients indexed by $C^t$. Note that the optimization in Step 7 and Step 14 can employ multiple steps of SGD steps or based on other optimizers.

Example FedAwS with Stochastic Negative Mining

There are two unique challenges that arise when we perform optimization w.r.t. (7). First, the best v is problem dependent and therefore hard to choose. Second, when C is large (also known as the extreme multiclass classification setting), even computing the spreadout regularizer becomes expensive. To this end, some example implementations can optionally use the following modification of (7)

$$reg_{sp}^{top}(W) = \sum_{c \in C^t} \sum_{\substack{y \in C', \\ y \neq c}} -d^2(w_c, w_y) \cdot y \in \mathcal{N}_k(c), \quad (8)$$

where $C^t$ is a subset of classes, and $\mathcal{N}_k(c)$ denotes the set of k classes that are closest to the class c in the embedding space. The regularizer in (8) can be viewed as an adaptive approximator of the spreadout regularizer in (7), where, for each class c, v is adaptively set to be the distance between $w_c$ and its (k+1)-th closest class embedding. Intuitively, we only need to make sure that, in the embedding space, each class is as far away as possible from its close classes. Thus, the most confusing classes (e.g., based on only the class embeddings) can be used. Furthermore, the methods can be applied at the server as a regularizer as opposed to defining the underlying loss function for an individual instance.

Example Devices and Systems

Figure 1:
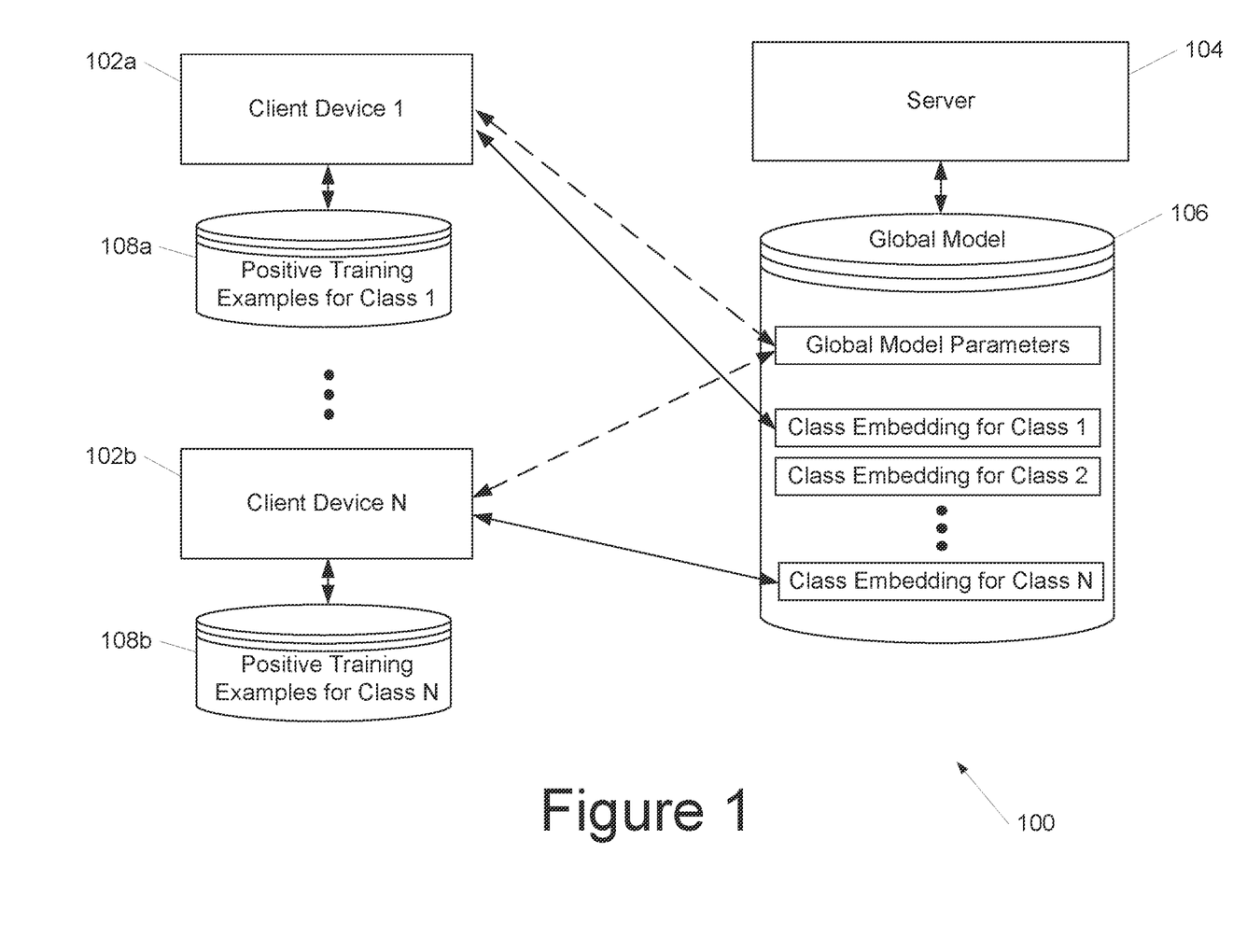
FIG. 1 depicts a block diagram of an example computing system performing federated learning of embeddings according to example embodiments of the present disclosure.

In some implementations, each of a number of client computing devices (shown as example devices 102a and 102b) may collect local data (shown as example locally stored data 108a and 108b). The local data may include positive training examples for one or more classes associated with the example devices 102a and 102b, respectively. In some implementations, a respective timestamp can be included in the data 108a for each positive example. In some implementations, only data samples collected within a recent window of data can be used to update the model/embeddings.

Positive examples may include audio, textual, photographic, or videographic inputs or outputs of the client computing device, including inputs to and outputs from sensors within the device (e.g., sensors for tracking spatial location and translation, biometrics, and/or interactions with additional other devices). Additional or alternative examples can include products, locations, places of business, users, and/or the like. In some examples, the local data 108a collected may include a history of a user's interaction with the device 102a and applications stored, accessed, and/or executed thereon. The data 108a may be stored in ephemeral or persistent storage media on the client device 102a. A user may be provided with controls which allow the user to control whether and what type of data is collected.

The client device 102a may process the data 108a to learn (e.g., updates for) one or more embeddings. The device 102a may obtain at least a subset of current global embeddings 106 for one or more of the classes for which the stored data 108a provides positive examples (e.g., by retrieving subset of the global embeddings 106 from a repository or server 104). The current global embeddings 106 may optionally be pre-trained according to embedding learning methods known in the art. As an example, as illustrated in FIG. 1, client device 102a has obtained Class Embedding 1 and the global model parameters. Likewise, client device 102b has obtained Class Embedding N and the global model parameters. While N client devices and N class embeddings are shown for ease of explanation, in some instances the number of clients may be more or less than the number of classes and class embeddings (e.g., two users consensually share one device and/or one user employs multiple devices).

In some implementations, a server 104 may provide data to a client (e.g., 102a) containing a set of one or more embeddings which each correspond to an identifier submitted by the client. The identifier may be determined by the client 102a to obfuscate the identity of the desired embedding(s) while still providing the server 104 with enough information to retrieve data containing the desired embedding(s).

Once a subset of the global embeddings 106 is obtained by the client device 102a, the client device 102a can determine one or more updates to one or more of the embeddings in view of the local data 108a. The local data 108a may form a set of ground truth training data for training the machine-learned embeddings. In some implementations, the ground truth training data includes ground truth input-output pairs for the machine-learned model, and the actual input-output pairs of the machine learned model are compared to the ground truth to determine an error or loss. Updates to one or more parameters of the machine-learned model or the embeddings may then be computed by the client device 102a based on the determined error.

In some implementations, satisfactory convergence of the machine-learned embeddings can be obtained without updating every embedding with each training iteration. In some examples, each training iteration includes computing updates for a target embedding.

After one or more updating iterations have been completed on the client device 102a, the client device 102a may transmit information indicative of the updates to a server 104 for updating the global embeddings 106. The information indicative of the updates may be provided to the server 104 for aggregation in a federated learning algorithm. For instance, the server 104 may execute a federated averaging algorithm (e.g., with spreadout as described herein). The federated averaging algorithm may use individual updates (e.g., updated local embedding versions) from a plurality of clients to obtain updated global embeddings 106.

In some implementations, updated parameters are provided to the server by a plurality of clients, and the respective updated parameters are summed across the plurality of clients. The sum for each of the updated parameters may then be divided by a corresponding sum of weights for each parameter as provided by the clients to form a set of weighted average updated parameters. In some implementations, updated parameters are provided to the server 104 by a plurality of clients, and the respective updated parameters scaled by their respective weights are summed across the plurality of clients to provide a set of weighted average updated parameters. In some examples, the weights may be correlated to a number of local training iterations or epochs so that more extensively trained updates contribute in a greater amount to the updated parameter version. In some examples, the weights may include a bitmask encoding observed entities in each training round (e.g., a bitmask may correspond to the indices of embeddings and/or negative samples provided to a client).

The information indicative of the updates may include the locally-updated embeddings (e.g., the updated embeddings or a difference between the updated embeddings and the previous embeddings). In some examples, the information indicative of the updates may include an update term, a corresponding weight, and/or a corresponding learning rate, and the server may determine therewith an updated version of the corresponding embedding. Communications between the server 104 and the clients can be encrypted or otherwise rendered private.

In general, the client devices may compute local updates to embeddings periodically or continually. The server may also compute global updates based on the provided client updates periodically or continually. In some implementations, the learning of embeddings includes an online or continuous machine-learning algorithm. For instance, some implementations may continuously update embeddings within the global set 106 without cycling through training the entire global set 106.

FIG. 1 depicts an example system 100 for training one or more global machine learning models 106 using respective training data 108a-b stored locally on a plurality of client devices 102a-b. Further to the descriptions above, a user may be provided with controls allowing the user to make an election as to both if and when systems, programs or features described herein may enable collection, storage, and/or use of user information (e.g., training data 108), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Client devices 102a-b can be configured to provide the local updates to server 104. As indicated above, training data 108a-b may be privacy sensitive. In this manner, the local updates can be performed and provided to server 104 without compromising the privacy of training data 108a-b. For instance, in such implementations, training data 108a-b is not provided to server 104. The local update does not include training data 108a-b. In some implementations, one or more of encryption techniques, random noise techniques, and/or other security techniques can be added to the training process to obscure any inferable information.

Figure 2:
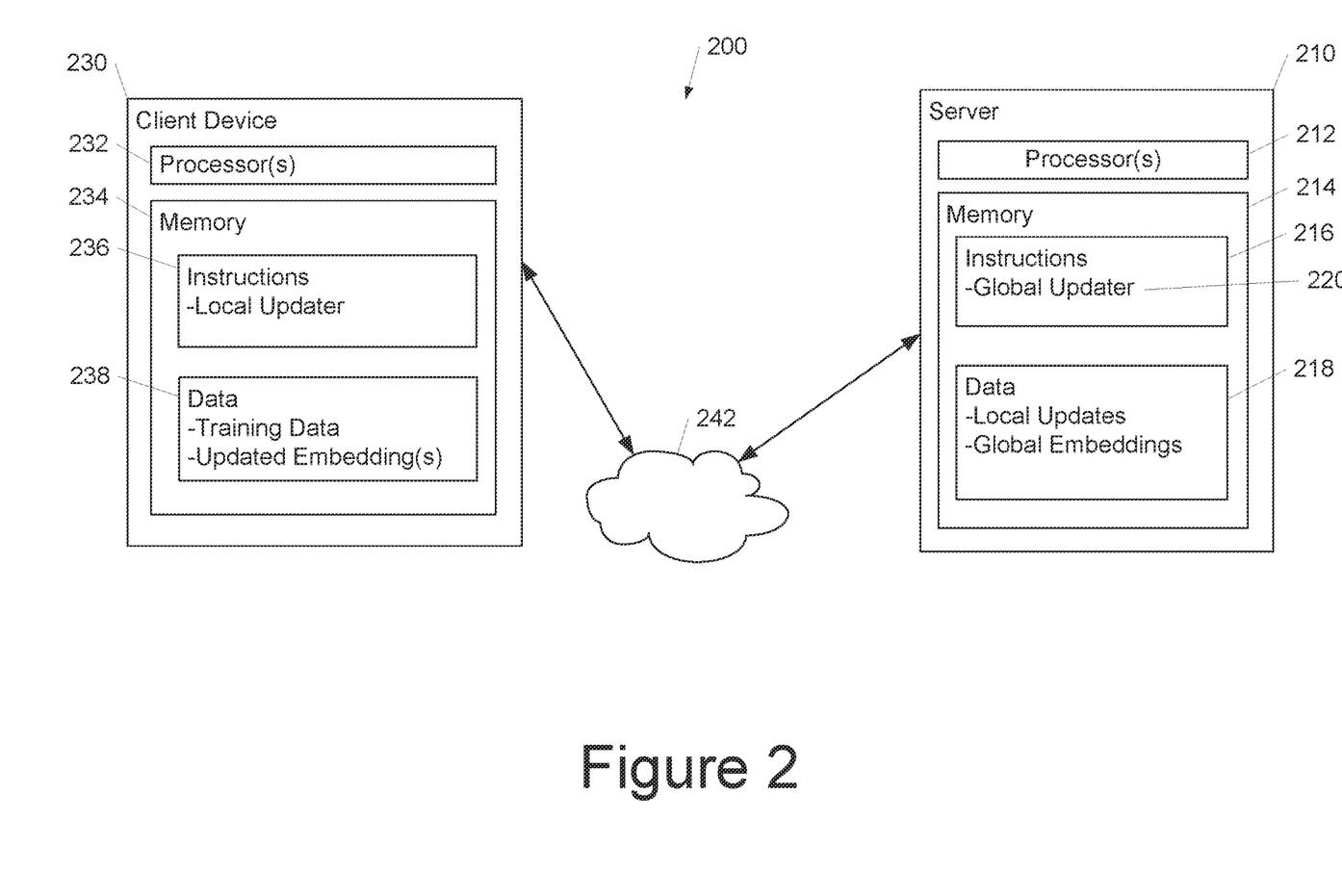
FIG. 2 depicts a block diagram of an example computing system for federated learning of embeddings according to example embodiments of the present disclosure.

FIG. 2 depicts a more detailed component-level diagram of an example computing system 200 that can be used to implement the methods and systems of the present disclosure. The system 200 can be implemented using a client-server architecture that includes a server 210 that communicates with one or more client devices 230 over a network 242. Thus, FIG. 2 provides an example system 200 that can implement the scheme illustrated by system 100 of FIG. 1.

The system 200 includes a server 210, such as a web server. The server 210 can be implemented using any suitable computing device(s). The server 210 can have one or more processors 212 and one or more memory devices 214. The server 210 can be implemented using one server device or a plurality of server devices. In implementations in which a plurality of devices are used, such plurality of devices can operate according to a parallel computing architecture, a sequential computing architecture, or a combination thereof.

The server 210 can also include a network interface used to communicate with one or more client devices 230 over the network 242. The network interface can include any suitable components for interfacing with one more networks, including for example, transmitters, receivers, ports, controllers, antennas, or other suitable components.

The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices. The one or more memory devices 214 can store information accessible by the one or more processors 212, including computer-readable instructions 216 that can be executed by the one or more processors 212.

The instructions 216 can be any set of instructions that when executed by the one or more processors 212, cause the one or more processors 212 to perform operations. For instance, the instructions 216 can be executed by the one or more processors 212 to implement a global updater 220. The global updater 220 can be configured to receive one or more local updates and to determine a global model based at least in part on the local updates. The global updater 220 can be configured to perform spreadout regularization.

As shown in FIG. 2, the one or more memory devices 214 can also store data 218 that can be retrieved, manipulated, created, or stored by the one or more processors 212. The data 218 can include, for instance, local updates, global parameters, and other data. The data 218 can be stored in one or more databases. The one or more databases can be connected to the server 210 by a high bandwidth LAN or WAN, or can also be connected to server 210 through network 242. The one or more databases can be split up so that they are located in multiple locales.

The server 210 can exchange data with one or more client devices 230 over the network 242. Any number of client devices 230 can be connected to the server 210 over the network 242. Each of the client devices 230 can be any suitable type of computing device, such as a general purpose computer, special purpose computer, laptop, desktop, mobile device, navigation system, smartphone, tablet, wearable computing device, gaming console, a display with one or more processors, embedded device, edge device, or other suitable computing device.

Similar to the server 210, a client device 230 can include one or more processor(s) 232 and a memory 234. The one or more processor(s) 232 can include, for example, one or more central processing units (CPUs), graphics processing units (GPUs) dedicated to efficiently rendering images or performing other specialized calculations, tensor processing units (TPUs), and/or other processing devices. The memory 234 can include one or more computer-readable media and can store information accessible by the one or more processors 232, including instructions 236 that can be executed by the one or more processors 232 and data 238.

The instructions 236 can include instructions for implementing a local updater configured to determine one or more local updates according to example aspects of the present disclosure. For example, the local updater can perform one or more training techniques such as, for example, backwards propagation of errors to re-train or otherwise update the model based on the locally stored training data. The local updater can be configured to perform structured updates, sketched updates, or other techniques. The local updater can be included in an application or can be included in the operating system of the device 230.

The data 238 can include one or more training data examples to be used in solving one or more optimization problems. The training data examples of each client device 230 can be distributed unevenly among the client devices, such that no client device 230 includes a representative sample of the overall distribution of the training data examples.

The data 238 can further include updated parameters to be communicated to the server 210.

The client device 230 of FIG. 2 can include various input/output devices for providing and receiving information from a user, such as a touch screen, touch pad, data entry keys, speakers, and/or a microphone suitable for voice recognition.

The client device 230 can also include a network interface used to communicate with one or more remote computing devices (e.g. server 210) over the network 242. The network interface can include any suitable components for interfacing with one more networks, including for example, transmitters, receivers, ports, controllers, antennas, or other suitable components.

The network 242 can be any type of communications network, such as a local area network (e.g. intranet), wide area network (e.g. Internet), cellular network, or some combination thereof. The network 242 can also include a direct connection between a client device 230 and the server 210. In general, communication between the server 210 and a client device 230 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Example Methods

Figure 3:
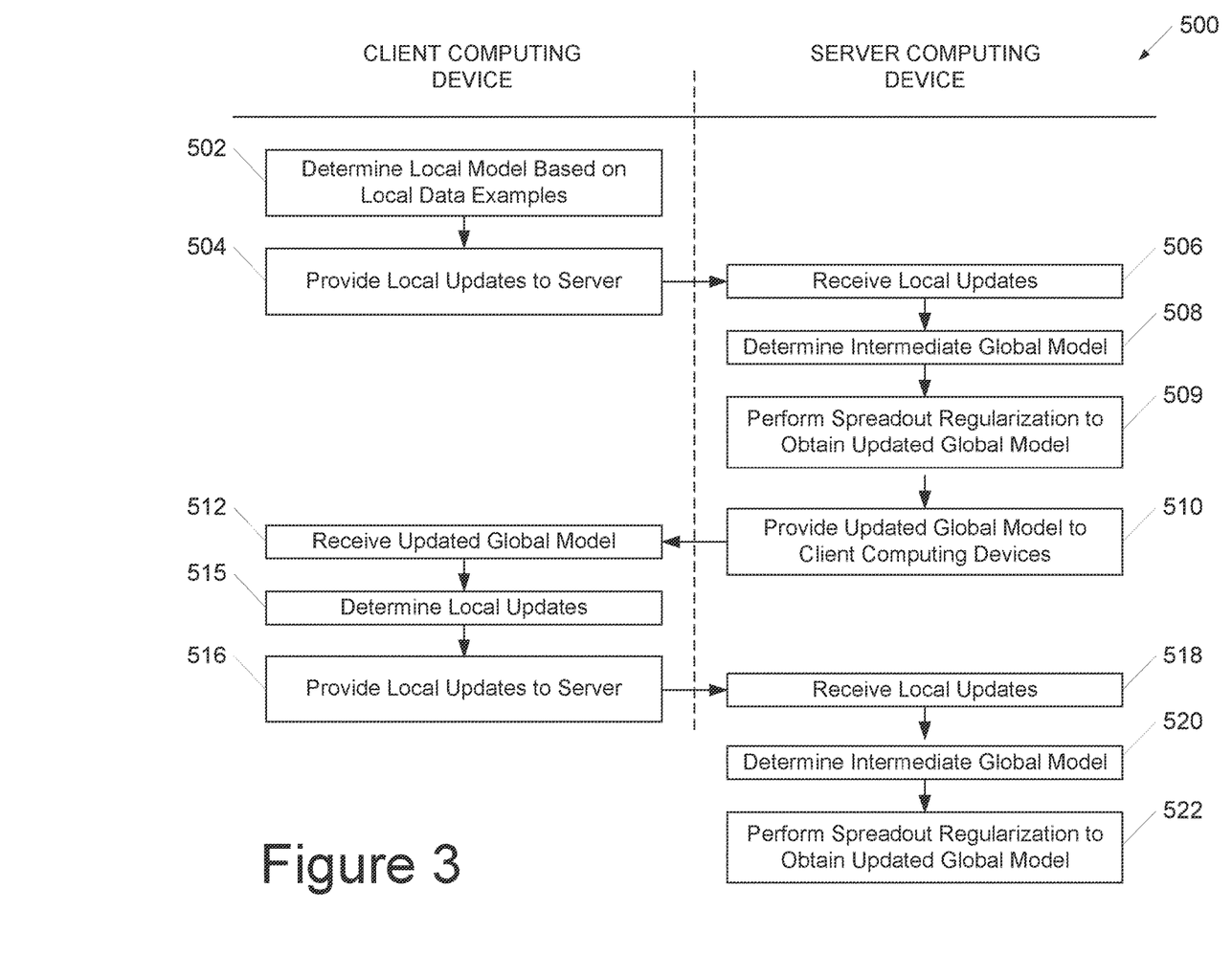
FIG. 3 depicts a flow chart diagram of an example method to perform federated learning according to example embodiments of the present disclosure.

FIG. 3 depicts a flow diagram of an example method (500) of determining a global model according to example embodiments of the present disclosure. Method (500) can be implemented by one or more computing devices, such as one or more of the computing devices depicted in FIGS. 1 and/or 2. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), method (500) can include determining, by a client device, a local model based on one or more local data examples. In particular, the local model can be determined for a loss function using the one or more data examples. The data examples may be generated, for instance, through interaction of a user with the client device. In some implementations, the model may have been pre-trained prior to local training at (502). In some implementations, structured update, sketched update, or other techniques can be used at (502) to render the learned local model or local update communication efficient. The local updates generated at (502) can include updates to one or more embeddings based on the local data.

At (504), method (500) can include providing, by the client device, the local model to a server, and at (506), method (500) can include receiving, by the server, the local model. In some implementations, the local model or local update can be encoded or compressed prior to sending the local model or update to the server. The local updates can include updates to one or more embeddings.

At (508), method (500) can include determining, by the server, an intermediate global model based at least in part on the received local model. For instance, the intermediate global model can be determined based at least in part on a plurality of local models provided by a plurality of client devices, each having a plurality of unevenly distributed data examples. In particular, the data examples may be distributed among the client devices such that no client device includes a representative sample of the overall distribution of data. In addition, the number of client devices may exceed the number of data examples on any one client device.

At (509), method (500) can include performing spreadout regularization to obtain an updated global model.

At (510), method (500) can include providing the updated global model to each client device (e.g., providing the global model parameters plus one or more updated class embeddings for classes to which the corresponding client device has permission to access), and at (512), method (500) can include receiving the updated global model at the client devices.

At (515), method (500) can include determining, by the client device, a local update. In a particular implementation, the local update can be determined by retraining or otherwise updating the global model based on the locally stored training data. In some implementations, structured update, sketched update, or other techniques can be used at (515) to render the learned local model or local update communication efficient. Again, the local updates can include updates to one or more embeddings.

At (516), method (500) can include providing, by the client device, the local update to the server. In some implementations, the local model or local update can be encoded prior to sending the local model or update to the server.

At (518), method (500) can include receiving, by the server, the local update. In particular, the server can receive a plurality of local updates from a plurality of client devices.

At (520), method (500) can include again determining an intermediate global model. In particular, the intermediate global model can be determined based at least in part on the received local update(s). For instance, the received local updates can be aggregated to determine the global model. The aggregation can be an additive aggregation and/or an averaging aggregation. In particular implementations, the aggregation of the local updates can be proportional to the partition sizes of the data examples on the client devices. In further embodiments the aggregation of the local updates can be scaled on a per-coordinate basis.

At (522), method (500) can include again performing spreadout regularization to obtain an updated global model.

Any number of iterations of local and global updates can be performed. That is, method (500) can be performed iteratively to update the global model based on locally stored training data over time.

Although FIG. 3 shows spreadout regularization occurring at the same frequency as updates to the model based on local updates, this is not required. For example, spreadout regularization can be performed with less frequency to reduce computational expenditure while still obtaining satisfactory results.

Figure 4:
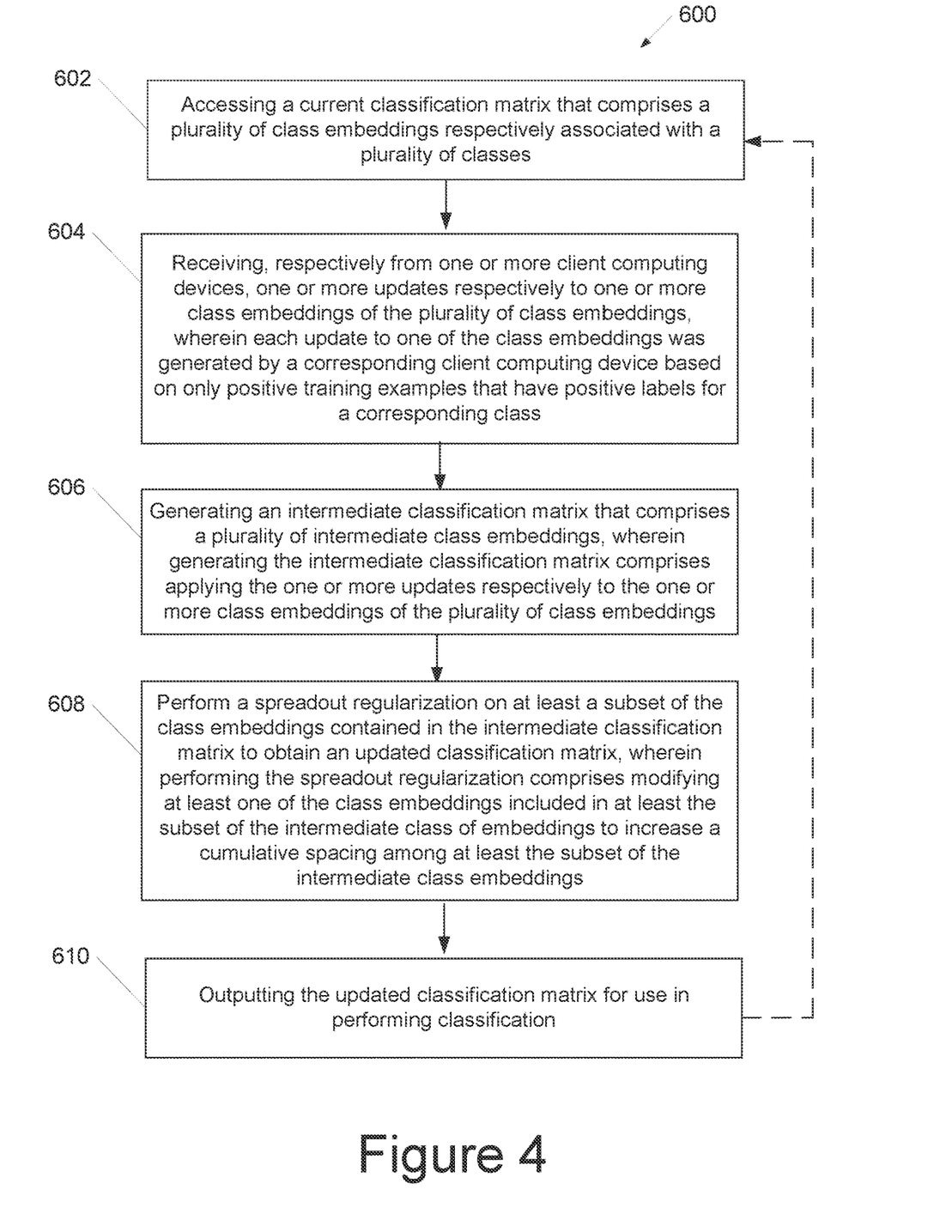
FIG. 4 depicts a flow chart diagram of an example method to perform federated learning at a client device according to example embodiments of the present disclosure.

FIG. 4 depicts a flow chart diagram of an example method 600 to perform federated learning at a coordinating system according to example embodiments of the present disclosure.

At (602), the method can include accessing a current classification matrix that comprises a plurality of class embeddings respectively associated with a plurality of classes.

At (604), the method can include receiving, respectively from one or more client computing devices, one or more updates respectively to one or more class embeddings of the plurality of class embeddings. Each update to one of the class embeddings may have been generated by a corresponding client computing device based on only positive training examples that have positive labels for a corresponding class.

In some implementations, receiving, respectively from the one or more client computing devices, the one or more updates respectively to the one or more class embeddings can include receiving, respectively from the one or more client computing devices, one or more replacement class embeddings respectively for the one or more class embeddings; and applying the one or more updates respectively to the one or more class embeddings can include respectively replacing the one or more class embeddings with the one or more replacement class embeddings.

At (606), the method can include generating an intermediate classification matrix that comprises a plurality of intermediate class embeddings. Generating the intermediate classification matrix can include applying the one or more updates respectively to the one or more class embeddings of the plurality of class embeddings.

At (608), the method can include performing a spreadout regularization on at least a subset of the intermediate class embeddings contained in the intermediate classification matrix to obtain an updated classification matrix. Performing the spreadout regularization can include modifying at least one of the class embeddings included in at least the subset of the intermediate class embeddings to increase a cumulative spacing among at least the subset of the intermediate class embeddings.

In some implementations, performing the spreadout regularization on at least the subset of the intermediate class embeddings can include performing a single unified spreadout regularization on all of the class embeddings contained in the intermediate classification matrix to obtain the updated classification matrix.

In some implementations, performing the spreadout regularization on at least the subset of the intermediate class embeddings can include performing, separately for each of one or more class embeddings, the spreadout regularization relative to only a subset of nearest class embeddings surrounding such class embedding.

In some implementations, performing, separately for each of the one or more class embeddings, the spreadout regularization relative to only the subset of nearest class embeddings surrounding such class embedding can include performing, separately for each of the class embeddings contained in the intermediate classification matrix, the spreadout regularization relative to only the subset of nearest class embeddings surrounding such class embedding.

In some implementations, performing the spreadout regularization can include updating one or more of the class embeddings contained in the classification matrix according to a learning rate and in a direction negative to a gradient of a spreadout regularization function.

In some implementations, performing the spreadout regularization can include evaluating a spreadout regularization function that evaluates the cumulative spacing among at least the subset of the intermediate class embeddings, and wherein a spacing between a pair of class embeddings can be a square of a maximum of a first value or a second value, wherein the first value equals zero and the second value equals a margin value minus a distance between the pair of class embeddings.

In some implementations, performing the spreadout regularization can include evaluating a spreadout regularization function that evaluates the cumulative spacing among only the subset of the intermediate class embeddings, and wherein a spacing between a pair of class embeddings can be a negative of a squared distance between the pair of class embeddings.

At (610), the method can include outputting the updated classification matrix for use in performing classification.

In some implementations, outputting the updated classification matrix for use in performing classification can include respectively transmitting one or more of the class embeddings from the updated classification matrix to the one or more client computing devices for use at the client computing devices in performing classification of inputs relative to the corresponding class.

In some implementations, the plurality of classes can be a plurality of facial recognition classes or speech recognition classes. In some implementations, the positive training examples for each class can be facial images or speech audio that has a positive label for such class.

Figure 5:
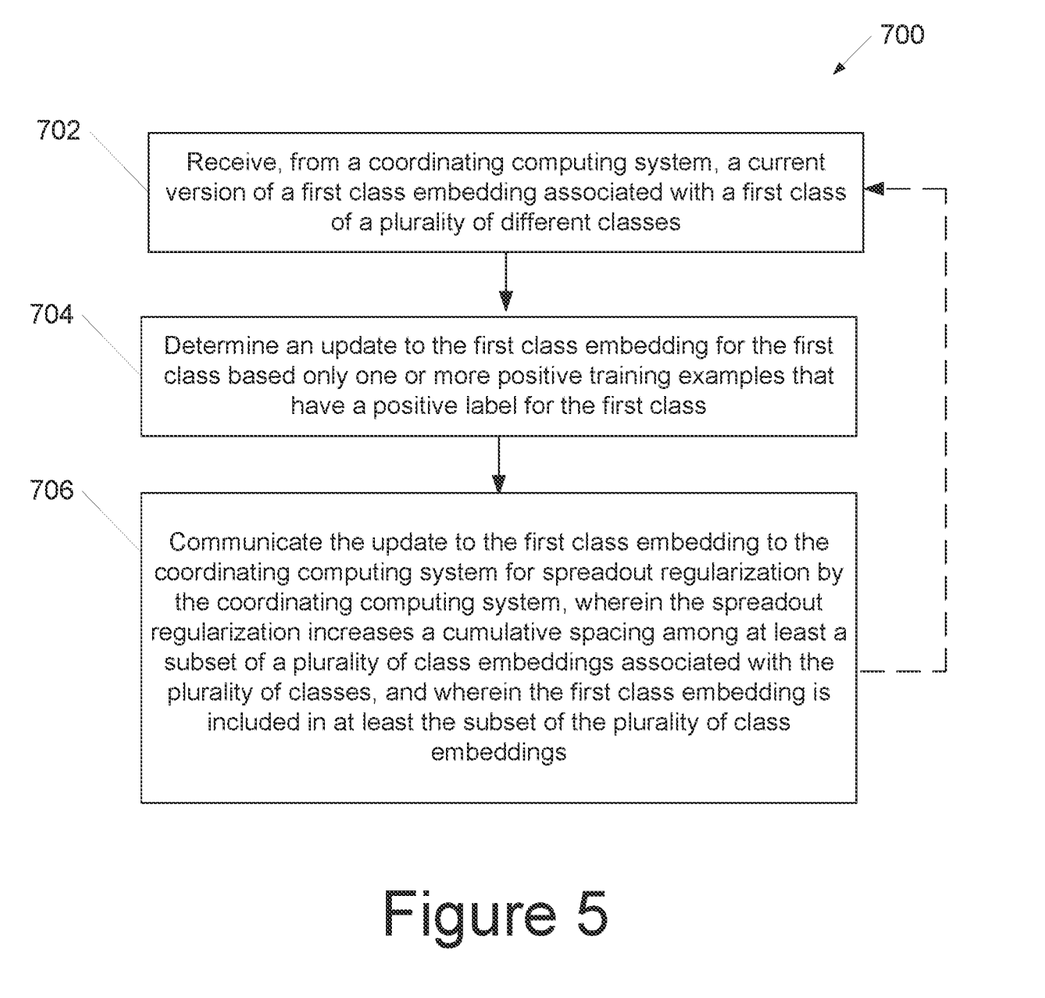
FIG. 5 depicts a flow chart diagram of an example method to perform federated learning at a coordinating computing system according to example embodiments of the present disclosure.

FIG. 5 depicts a flow chart diagram of an example method 700 to perform federated learning at a client device according to example embodiments of the present disclosure.

At (702), method (700) can include receiving, from a coordinating computing system, a current version of a first class embedding associated with a first class of a plurality of different classes.

At (704), method (700) can include determining an update to the first class embedding for the first class based only one or more positive training examples that have a positive label for the first class.

At (706), method (700) can include communicating the update to the first class embedding to the coordinating computing system for spreadout regularization by the coordinating computing system, wherein the spreadout regularization increases a cumulative spacing among at least a subset of a plurality of class embeddings associated with the plurality of classes, and wherein the first class embedding is included in at least the subset of the plurality of class embeddings.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system that performs spreadout regularization to prevent model collapse in a federated learning setting with only positive labels, the computing system comprising:

a coordinating computing system comprising one or more processors and one or more memory devices storing instructions that, when executed by the one or more processors, cause the coordinating computing system to perform coordinating operations, the coordinating operations comprising, for at least one of one or more update iterations:

accessing, from one or more databases stored in the one or more memory devices, a current classification matrix that comprises a plurality of class embeddings respectively associated with a plurality of classes;

receiving, via a network interface and respectively from one or more client computing devices, one or more updates respectively to one or more class embeddings of the plurality of class embeddings, wherein each update to one of the class embeddings was generated by a corresponding client computing device based on only positive training examples that have positive labels for a corresponding class, wherein the client computing devices lack access to negative class embeddings for other classes, and wherein each update is transmitted to the coordinating computing system without transmitting the positive training examples themselves, thereby reducing communication of private information;

generating an intermediate classification matrix that comprises a plurality of intermediate class embeddings, wherein generating the intermediate classification matrix comprises applying the one or more updates respectively to the one or more class embeddings of the plurality of class embeddings;

performing a spreadout regularization on at least a subset of the intermediate class embeddings contained in the intermediate classification matrix to obtain an updated classification matrix, wherein performing the spreadout regularization comprises modifying at least one of the class embeddings included in at least the subset of the intermediate class embeddings to increase a cumulative spacing among at least the subset of the intermediate class embeddings, thereby preventing the class embeddings from collapsing to a shared point in an embedding space; and outputting the updated classification matrix for use in performing classification.

2. The computing system of claim 1, wherein:

receiving, via the network interface and respectively from the one or more client computing devices, the one or more updates respectively to the one or more class embeddings comprises receiving, via a network interface and respectively from the one or more client computing devices, one or more replacement class embeddings respectively for the one or more class embeddings; and applying the one or more updates respectively to the one or more class embeddings comprises respectively replacing the one or more class embeddings with the one or more replacement class embeddings.

3. The computing system of claim 1, wherein performing the spreadout regularization on at least the subset of the intermediate class embeddings comprises performing a single unified spreadout regularization on all of the class embeddings contained in the intermediate classification matrix to obtain the updated classification matrix.

4. The computing system of claim 1, wherein performing the spreadout regularization on at least the subset of the intermediate class embeddings comprises performing, separately for each of one or more class embeddings, the spreadout regularization relative to only a subset of nearest class embeddings surrounding such class embedding.

5. The computing system of claim 4, wherein performing, separately for each of the one or more class embeddings, the spreadout regularization relative to only the subset of nearest class embeddings surrounding such class embedding comprises performing, separately for each of the class embeddings contained in the intermediate classification matrix, the spreadout regularization relative to only the subset of nearest class embeddings surrounding such class embedding.

6. The computing system of claim 1, wherein performing the spreadout regularization comprises updating one or more of the class embeddings contained in the classification matrix according to a learning rate and in a direction negative to a gradient of a spreadout regularization function.

7. The computing system of claim 1, wherein performing the spreadout regularization comprises evaluating a spreadout regularization function that evaluates the cumulative spacing among at least the subset of the intermediate class embeddings, and wherein a spacing between a pair of class embeddings comprises a square of a maximum of a first value or a second value, wherein the first value equals zero and the second value equals a margin value minus a distance between the pair of class embeddings.

8. The computing system of claim 1, wherein performing the spreadout regularization comprises evaluating a spreadout regularization function that evaluates the cumulative spacing among only the subset of the intermediate class embeddings, and wherein a spacing between a pair of class embeddings comprises a negative of a squared distance between the pair of class embeddings.

9. The computing system of claim 1, wherein outputting the updated classification matrix for use in performing classification comprises respectively transmitting one or more of the class embeddings from the updated classification matrix to the one or more client computing devices for use at the client computing devices in performing classification of inputs relative to the corresponding class.

10. The computing system of claim 1, further comprising:
at least one client computing device of the one or more client computing devices, wherein the at least one client computing device is configured to perform client operations, the client operations comprising, for at least one of the one or more update iterations:
receiving a current version of a first class embedding from the coordinating computing system for a first class of the plurality of classes, wherein the current version of the first class embedding is contained in the updated classification matrix, and wherein at least a majority of training examples accessible by the client computing device comprise positive training examples that have positive labels for the first class;
determining an update to the first class embedding for the first class based on the positive training examples; and
communicating the update to the first class embedding to the coordinating computing system.

11. The computing system of claim 10, wherein the client computing device comprises a smartphone.

12. The computing system of claim 1, wherein the plurality of classes comprises a plurality of facial recognition classes or speech recognition classes.

13. The computing system of claim 12, wherein the positive training examples for each class comprise facial images or speech audio that has a positive label for such class.

14. A client computing device, comprising:
one or more processors; and
one or more non-transitory computer-readable media that collectively store:
one or more positive training examples that have a positive label for a first class of a plurality of different classes; and
instructions that, when executed by the one or more processors, cause the client computing device to perform client operations, the client operations comprising, for at least one of one or more update iterations:
receiving, via a network interface and from a coordinating computing system, a current version of a first class embedding associated with the first class;
determining an update to the first class embedding for the first class based only on the one or more positive training examples, and wherein the client computing device lacks access to negative class embeddings for other classes; and
communicating, via the network interface, the update to the first class embedding to the coordinating computing system for spreadout regularization by the coordinating computing system, wherein the update is communicated to the coordinating computing system without transmitting the positive training examples themselves, thereby reducing communication of private information, wherein the spreadout regularization increases a cumulative spacing among at least a subset of a plurality of class embeddings associated with the plurality of different classes, thereby preventing the class embeddings from collapsing to a shared point in an embedding space, and wherein the first class embedding is included in at least the subset of the plurality of class embeddings.

15. One or more non-transitory computer-readable media that collectively store class embeddings from an updated class classification matrix having been generated by performance of operations, the operations comprising:
accessing, from one or more databases stored in the one or more memory devices, a current classification matrix that comprises a plurality of class embeddings respectively associated with a plurality of classes;
receiving, via a network interface and respectively from one or more client computing devices, one or more updates respectively to one or more class embeddings of the plurality of class embeddings, wherein each update to one of the class embeddings was generated by a corresponding client computing device based on only positive training examples that have positive labels for a corresponding class, wherein the client computing devices lack access to negative class embeddings for other classes, and wherein each update is transmitted to the coordinating computing system without transmitting the positive training examples themselves, thereby reducing communication of private information;
generating an intermediate classification matrix that comprises a plurality of intermediate class embeddings, wherein generating the intermediate classification matrix comprises applying the one or more updates respectively to the one or more class embeddings of the plurality of class embeddings;
performing a spreadout regularization on at least a subset of the intermediate class embeddings contained in the intermediate classification matrix to obtain the updated classification matrix, wherein performing the spreadout regularization comprises modifying at least one of the class embeddings included in at least the subset of the intermediate class embeddings to increase a cumulative spacing among at least the subset of the intermediate class embeddings, thereby preventing the class embeddings from collapsing to a shared point in an embedding space; and
outputting the updated classification matrix for use in performing classification.

16. The one or more non-transitory computer-readable media of claim 15, wherein:

receiving, via the network interface and respectively from the one or more client computing devices, the one or more updates respectively to the one or more class embeddings comprises receiving, via the network interface and respectively from the one or more client computing devices, one or more replacement class embeddings respectively for the one or more class embeddings; and applying the one or more updates respectively to the one or more class embeddings comprises respectively replacing the one or more class embeddings with the one or more replacement class embeddings.

17. The one or more non-transitory computer-readable media of claim 15, wherein performing the spreadout regularization on at least the subset of the intermediate class embeddings comprises performing a single unified spreadout regularization on all of the class embeddings contained in the intermediate classification matrix to obtain the updated classification matrix.

18. The one or more non-transitory computer-readable media of claim 15, wherein performing the spreadout regularization on at least the subset of the intermediate class embeddings comprises performing, separately for each of one or more class embeddings, the spreadout regularization relative to only a subset of nearest class embeddings surrounding such class embedding.

19. The one or more non-transitory computer-readable media of claim 18, wherein performing, separately for each of the one or more class embeddings, the spreadout regularization relative to only the subset of nearest class embeddings surrounding such class embedding comprises performing, separately for each of the class embeddings contained in the intermediate classification matrix, the spreadout regularization relative to only the subset of nearest class embeddings surrounding such class embedding.

20. The one or more non-transitory computer-readable media of claim 15, wherein performing the spreadout regularization comprises updating one or more of the class embeddings contained in the classification matrix according to a learning rate and in a direction negative to a gradient of a spreadout regularization function.

* * * * *